United States Patent
Lolio, Jr.

(10) Patent No.: US 9,598,868 B2
(45) Date of Patent: Mar. 21, 2017

(54) WATER DIVERTING SILICONE RUBBER UNIVERSAL FIT DOWNSPOUT EXTENSION

(71) Applicant: Thomas W. Lolio, Jr., Sevierville, TN (US)

(72) Inventor: Thomas W. Lolio, Jr., Sevierville, TN (US)

( * ) Notice: Subject to any disclaimer, the term of this patent is extended or adjusted under 35 U.S.C. 154(b) by 0 days.

(21) Appl. No.: 15/054,187

(22) Filed: Feb. 26, 2016

(65) Prior Publication Data
US 2016/0281364 A1 Sep. 29, 2016

Related U.S. Application Data

(60) Provisional application No. 62/139,363, filed on Mar. 27, 2015.

(51) Int. Cl.
| | | |
|---|---|---|
| *E04D 13/08* | (2006.01) | |
| *E04D 13/064* | (2006.01) | |
| *E02D 31/06* | (2006.01) | |
| *A01G 13/00* | (2006.01) | |

(52) U.S. Cl.
CPC ......... *E04D 13/08* (2013.01); *A01G 13/0237* (2013.01); *E02D 31/06* (2013.01); *E04D 13/0645* (2013.01); *E04D 2013/0813* (2013.01); *E04D 2013/0833* (2013.01); *E04D 2013/0846* (2013.01)

(58) Field of Classification Search
CPC ................ E04D 13/08; E04D 13/0645; E04D 2013/0833; E04D 2013/0846; E04D 2013/0813
See application file for complete search history.

(56) References Cited

U.S. PATENT DOCUMENTS

| | | | |
|---|---|---|---|
| 3,035,779 A | 5/1962 | Convis | |
| 3,966,121 A * | 6/1976 | Littman | B05B 1/20 239/197 |
| 5,062,456 A | 11/1991 | Cooke et al. | |
| 5,607,107 A * | 3/1997 | Grieve | E02B 11/005 137/355.23 |
| 6,886,761 B2 | 5/2005 | Cohen | |
| 8,322,083 B1 * | 12/2012 | Kessler | E04D 13/08 137/615 |
| 8,556,195 B1 | 10/2013 | Sloan, Jr. | |
| 8,689,837 B1 | 4/2014 | Smith | |
| 2005/0155660 A1 * | 7/2005 | Handley | E04D 13/08 138/109 |
| 2008/0023959 A1 * | 1/2008 | Crawford | E04D 13/08 285/226 |
| 2010/0126078 A1 * | 5/2010 | Leahy | E04D 13/0645 52/16 |
| 2011/0173897 A1 | 7/2011 | Schneider | |
| 2012/0068452 A1 * | 3/2012 | Boettner | E03F 1/002 285/45 |

(Continued)

*Primary Examiner* — Brian Mattei
*Assistant Examiner* — Paola Agudelo
(74) *Attorney, Agent, or Firm* — Pitts & Lake, P.C.

(57) ABSTRACT

A gutter downspout extension, extruded from a medium to high density silicone rubber material for diverting water from a foundation of a structure. The silicone rubber material has a sufficient density to resist abrasion or cutting by filament line weed trimmers. The silicone rubber material has sufficient elasticity to allow the end of the downspout extension to be stretched over the end of a gutter downspout.

16 Claims, 5 Drawing Sheets

(56) References Cited

U.S. PATENT DOCUMENTS

| | | | | |
|---|---|---|---|---|
| 2012/0125465 A1* | 5/2012 | Bell | ........................ | F16L 9/003 |
| | | | | 138/37 |
| 2012/0247580 A1* | 10/2012 | Guinyard | ................ | E04D 13/08 |
| | | | | 137/357 |
| 2013/0118625 A1* | 5/2013 | Bell | ........................ | E04D 13/08 |
| | | | | 138/37 |
| 2015/0267413 A1* | 9/2015 | Hull | .................... | E04D 13/1476 |
| | | | | 52/58 |

* cited by examiner

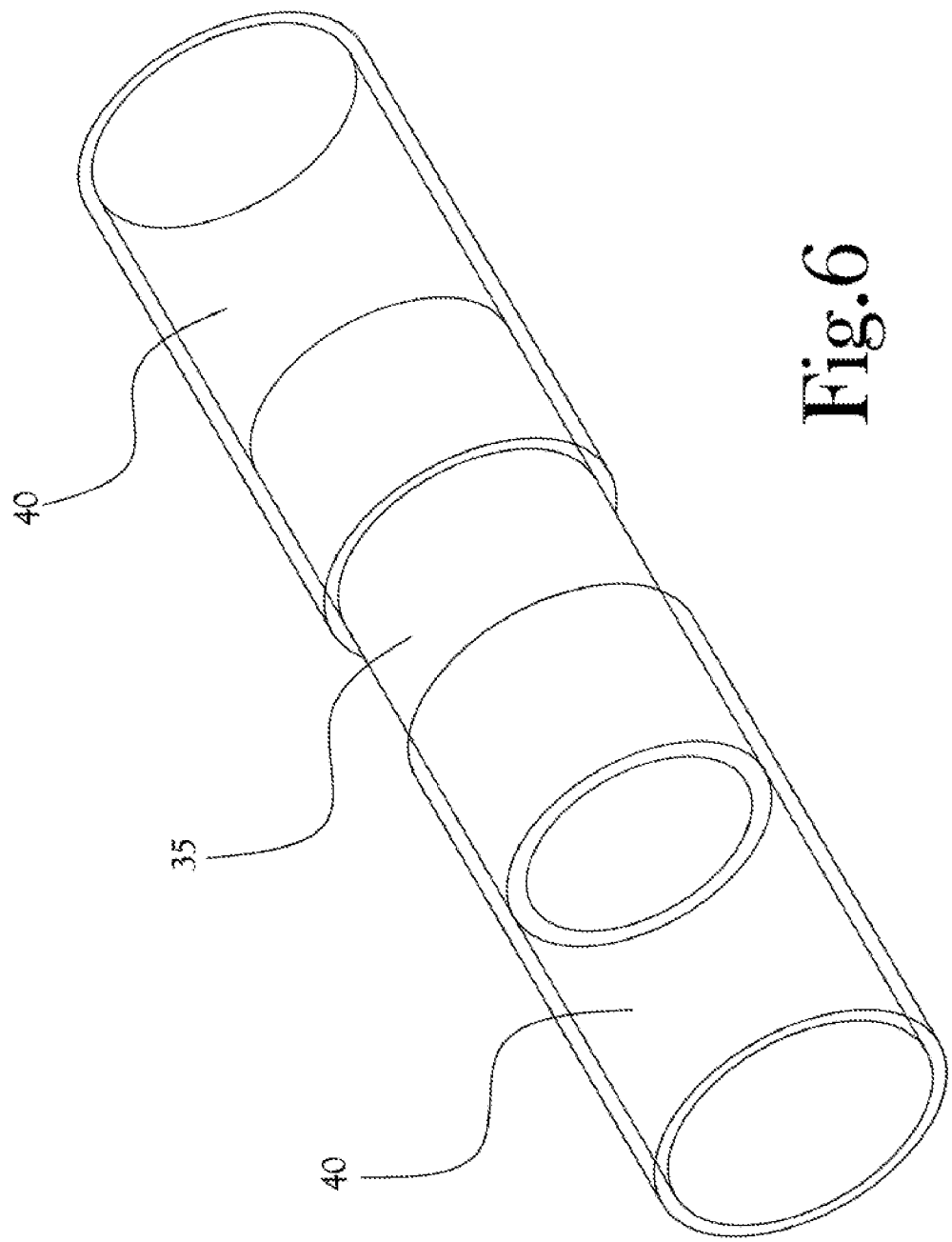

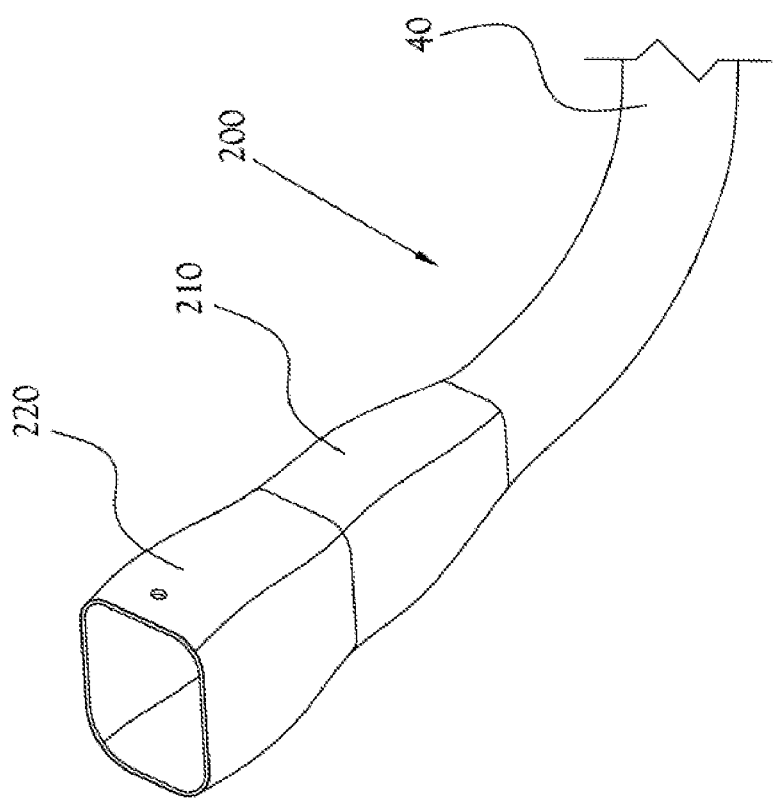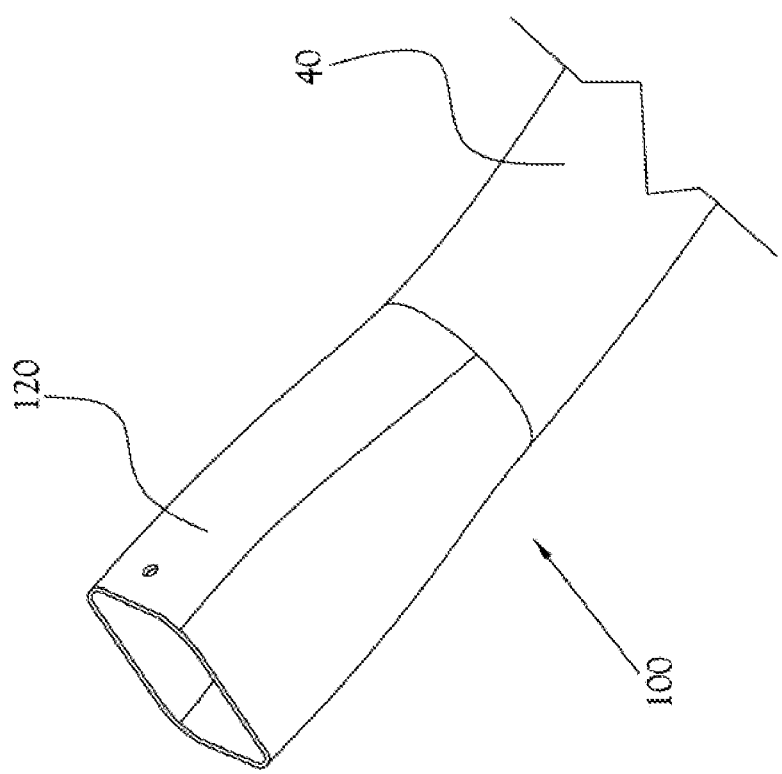

WATER DIVERTING SILICONE RUBBER UNIVERSAL FIT DOWNSPOUT EXTENSION

CROSS-REFERENCE TO RELATED APPLICATIONS

This application claims the benefit of U.S. Provisional Patent Application No. 62/139,363, filed on Mar. 27, 2015, which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to lawn accessories extruded from a dense silicone rubber. More particularly, the invention relates to an extension for a gutter downspout for diverting the flow of rainwater away from a building's foundation.

2. Description of the Related Art

Gutters have long been used to divert the flow of water, such as rain water or snow melt, off of the roof of a structure. Typically, gutters direct the flow of water to one or more downspouts, which themselves direct the flow of water away from the base of the building. Generally, the downspout directs the flow of water towards a splash block or other means of channeling the flow of water away from the base of the building. Often it is desirable to direct the flow of water farther from the base of the building. To this end, various extensions have been developed in the art. For instance, U.S. Published Patent Application No. 2011/0173897, published on Jul. 21, 2011, for Schneider, entitled Apparatus and Method for Protecting a Downspout of a Gutter, discloses a cover, made from a flexible/elastic material, for protecting the end of a gutter downspout. Additionally, U.S. Published Patent Application No. 2012/0125465, published on May 24, 2012, for Bell et al. discloses a low-profile, water diverting, downspout extension. Additionally, U.S. Pat. No. 8,689,837, issued to Smith on Apr. 8, 2014, and initially published on Dec. 10, 2009, discloses a flexible downspout extension. Many of the existing downspout extensions are produced from a complex molding process to produce a bellows-type profile that allows for bending and provides some structural rigidity. And, this bellows configuration produces a series of alternating internal ribs and channels that can trap debris, impeding the flow of water there thru, and allow water to freeze in these channels. Further, many are produced from plastic materials that are susceptible to being broken or cut by impact with lawn care equipment, for example these materials are susceptible to being cut by typical filament line weed-trimming equipment. Further, these materials are susceptible to becoming brittle upon exposure to sub-freezing temperatures creating an appreciable risk of shattering if the extension is stepped on or driven over by a piece of equipment or other type of vehicle.

What is missing in the art is a gutter downspout extension that is made of a dense silicone rubber material that resists being cut by filament line weed trimmers, that is resistant to becoming brittle in sub-freezing temperatures, and that can be simply extruded into a desired shape.

BRIEF SUMMARY OF THE INVENTION

The gutter downspout extension is, in one exemplary embodiment, substantially tubular in cross-section. In an exemplary embodiment, the downspout extension has a substantially oval cross-section. It is, in an exemplary embodiment, constructed of an extruded silicone rubber material having sufficient density to maintain a tubular shape. Further, the silicone rubber material has a sufficient density to resist abrasion or cutting by filament line weed trimmers. Further, the silicone rubber material has sufficient elasticity to allow the end of the downspout extension to be stretched over the end of a gutter downspout. Those skilled in the art will recognize that gutter downspouts come in a variety of sizes. This resiliency allows the downspout extension to be stretched so that a single size of downspout extension can fit various sizes of downspout extensions. Further, while this elasticity allows the downspout extension to be partially secured to the downspout extension by a tight frictional fit, in an exemplary embodiment, a screw, such as a self-tapping screw, can be utilized to provide for an additional level of securement of the downspout extension to the gutter downspout. Other exemplary embodiments include downspout extensions that have formed ends adapted to receive the end of a gutter downspout and which are sized for commonly known gutter downspouts.

BRIEF DESCRIPTION OF THE SEVERAL VIEWS OF THE DRAWINGS

The above-mentioned features of the invention will become more clearly understood from the following detailed description of the invention read together with the drawings in which:

FIG. 6 is a perspective view of an exemplary embodiment means for joining two sections of the gutter downspout extension of the present invention;

FIG. 7 is a perspective view of a further exemplary embodiment of the gutter downspout of the present invention; and FIG. 8 is a perspective view of yet another exemplary embodiment of the gutter downspout of the present invention.

DETAILED DESCRIPTION OF THE INVENTION

Figure 1:
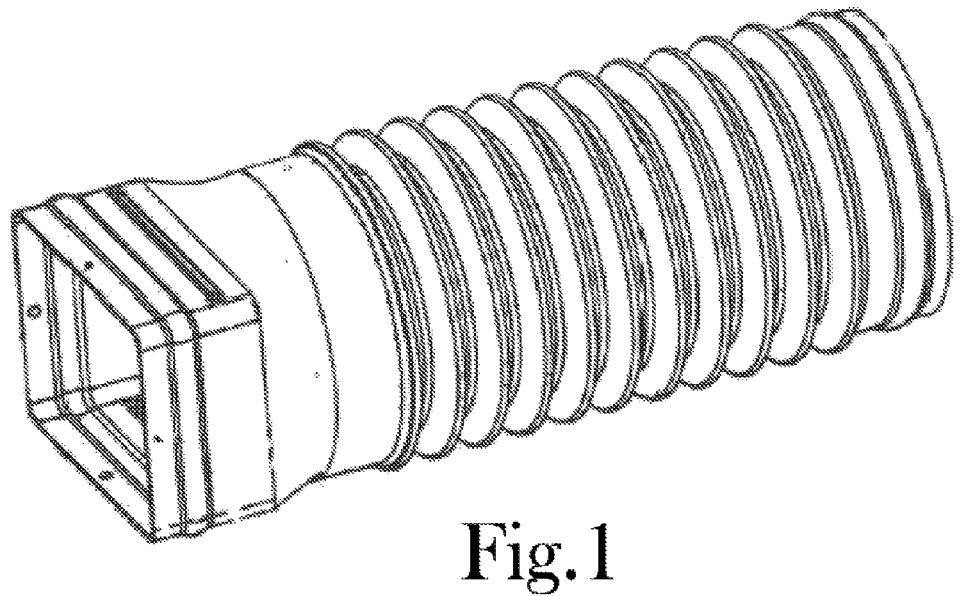
FIG. 1 is a perspective view of a prior art downspout extension.
Figure 2:
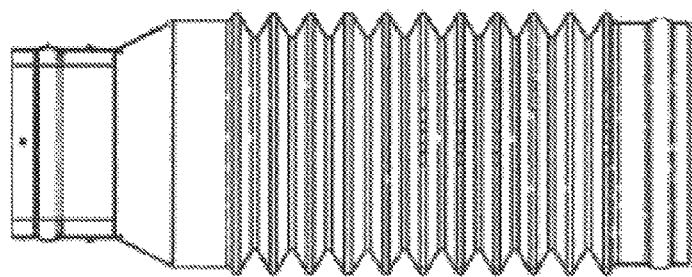
FIG. 2 is an elevation view of a further embodiment of the prior art downspout extension illustrated in FIG. 1.
Figure 3:
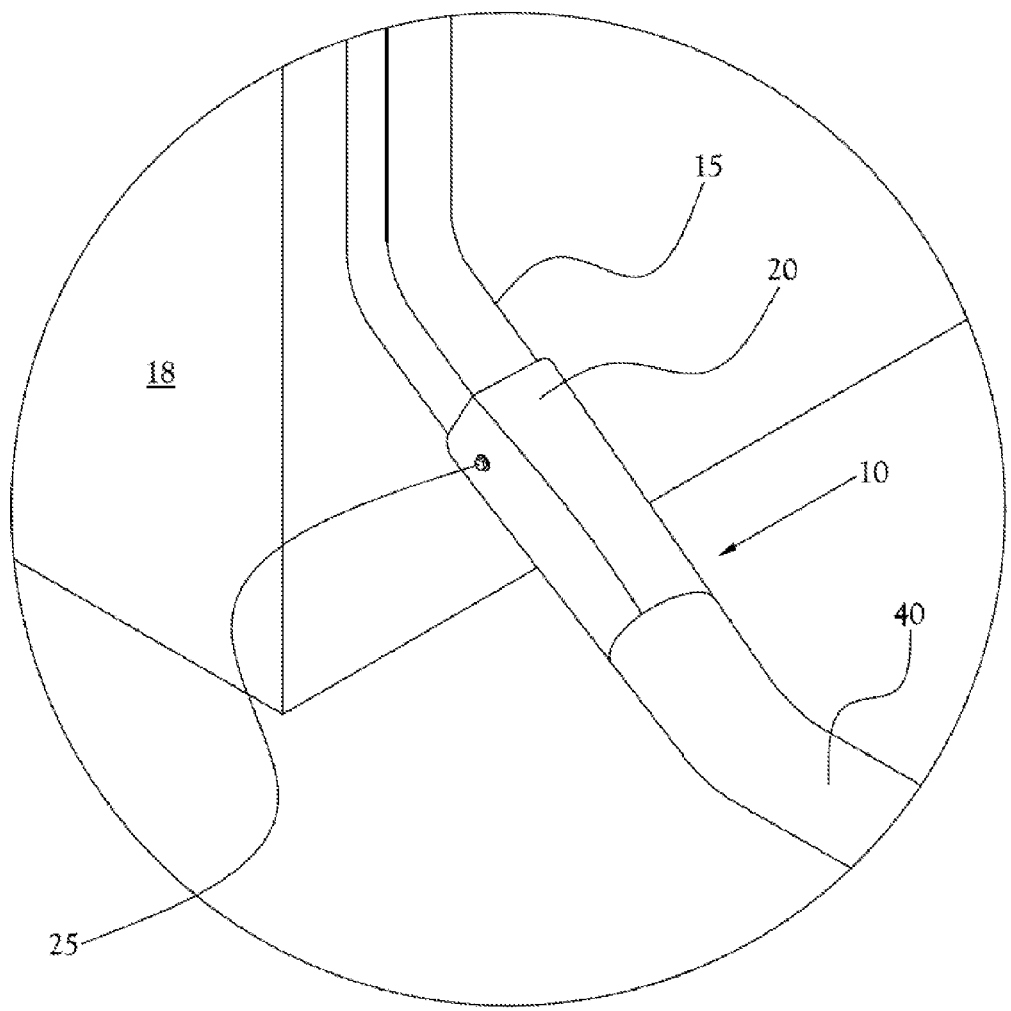
FIG. 3 is a perspective view of an exemplary embodiment of the gutter downspout extension secured to a gutter on the side of a building
Figure 4:
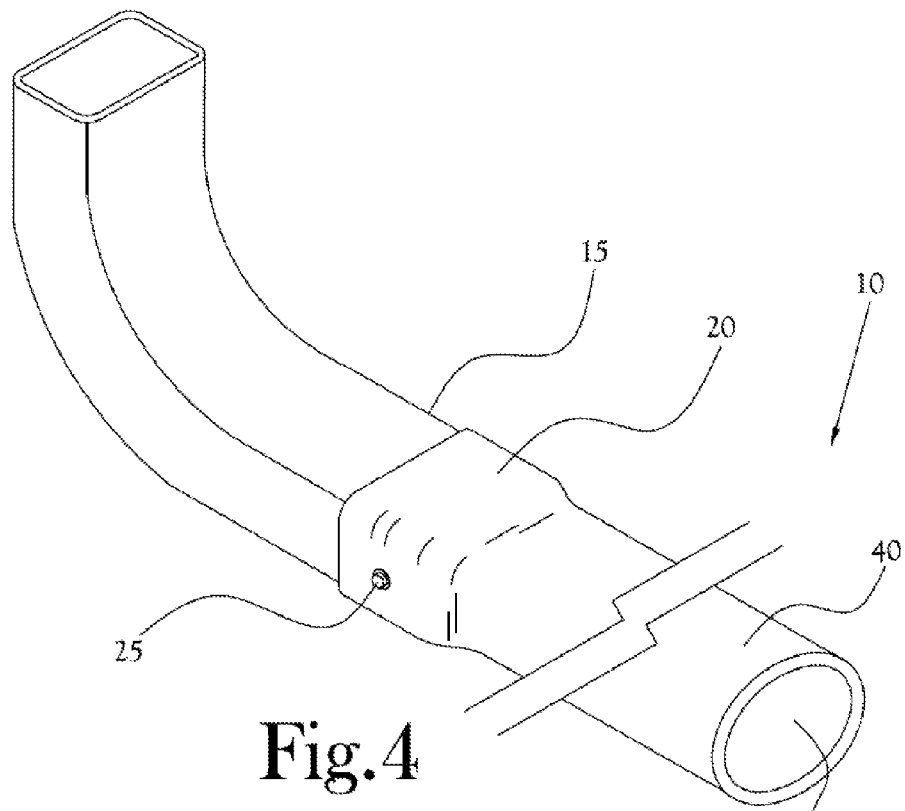
FIG. 4 is a perspective view of an exemplary embodiment of the gutter downspout extension of the present general inventive concept.
Figure 5:
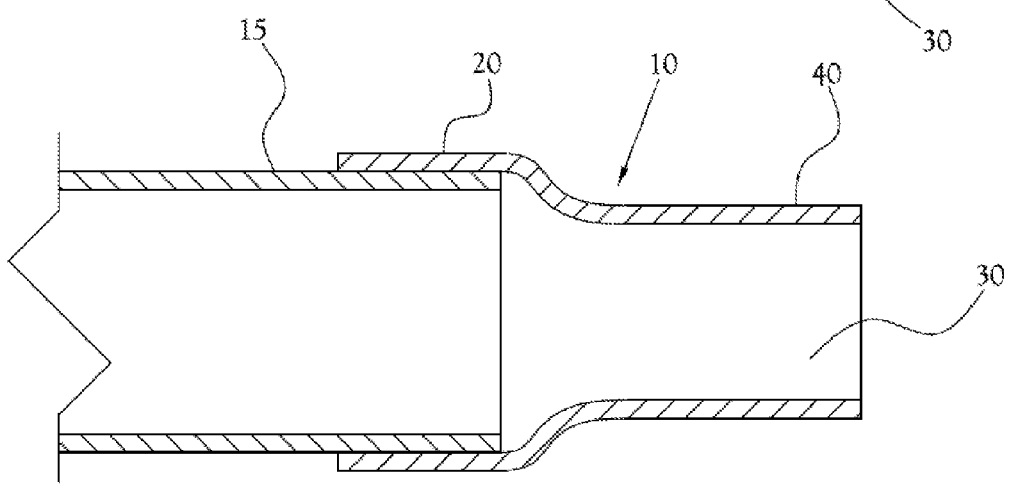
FIG. 5 is a cross-sectional view of the embodiment of the gutter downspout extension illustrated in FIG. 4.

FIGS. 1 and 2 illustrate typical bellows construction downspout extensions as are known in the art. The bellows construction of the prior art downspouts can trap debris and can retain water that is subject to freezing. Further, many of the prior art devices are subject to being broken from impacts with lawn-care equipment and are further subject to becoming brittle and shattering in sub-freezing temperatures. It will be recognized by those skilled in the art that a gutter downspout, such as gutter downspout 15, illustrated in FIG. 3, is typically secured to an exterior wall of a building 18 for diverting rainwater, snow melt, etc. away from the base of building 18. However, it is often desirable and/or necessary to extend the gutter downspout in order to divert the flow of water farther from building 18. FIGS. 3, 4, and 5 illustrate a gutter downspout extension 10 formed by extruding a medium to high density silicone rubber material. Downspout extension 10 has a tubular body 40 of a length selected to divert rainwater a desired distance from the base of building 18. The tubular body 40 of downspout extension 10 is constructed of a silicone rubber material having a density selected to maintain a substantially tubular cross-sectional shape. Further, the silicone rubber material is adapted to resist being cut by state-of-the-art lawn trimmers and it also resists becoming brittle in sub-freezing temperatures. In an exemplary embodiment the tubular body 40 of downspout extension 10 has a first end 20 adapted to receive a terminal end of a gutter downspout.

The gutter downspout extension 10 is, in an exemplary embodiment, substantially tubular in cross-section. In an exemplary embodiment, as illustrated in FIG. 4, downspout extension 10 has a substantially oval configuration. Downspout extension 10 is, in an exemplary embodiment, constructed of an extruded silicone rubber material having sufficient density to maintain its substantially oval, tubular shape as illustrated in FIG. 4. Further, the silicone rubber material has a sufficient density to resist abrasion or cutting by filament line weed trimmers. While, in an exemplary embodiment, the silicone rubber material is sufficiently dense to resist abrasion or cutting, the silicone rubber material must also retain sufficient elasticity to allow the end 20 of the downspout extension 10 to be stretched over the end of a gutter downspout 15. Further, while this elasticity allows the downspout extension 10 to be partially secured to the downspout extension 15 by a tight frictional fit, in an exemplary embodiment, a screw 25, such as a self-tapping screw, can be utilized to provide for an additional level of securement of the downspout extension 10 to the gutter downspout 15. It will be appreciated by those skilled in the art screw 25 could be screwed directly through the silicone rubber material, or a hole adapted to receive screw 25 could be pre-formed in the end 20 of downspout extension 10. As illustrated in FIG. 6, if desired, a coupling 35 could be provided for joining two lengths of downspout extension 10.

Those skilled in the art will recognize that gutter downspouts, such as downspout 15, come in a variety of sizes. For instance, those skilled in the art will recognize that residential downspouts are typically approximately 4" wide, while industrial downspouts are commonly 6" wide. In an exemplary embodiment, downspout extension 10 has an oval cross-section of approximately 4.5" by approximately 2.45", which allows the resilient silicone rubber material to be stretched to fit either a 4" or 6" downspout elbow. Alternatively, in a further exemplary embodiment, as illustrated in FIG. 7, a gutter downspout extension 100 could have an end 120 formed into substantially rectangular shape adapted to receive the gutter downspout 15. In this regard, the end 120 of downspout extension 100 could be selectively sized to be received by a chosen gutter downspout. For instance, for residential applications, the end 120 of downspout extension 100 could be sized to be received by an approximately 4" gutter downspout. Further, in industrial applications, the end 120 of downspout extension 100 could be sized to be received by an approximately 6" gutter downspout.

In still a further exemplary embodiment, illustrated in FIG. 8, downspout extension 200 is adapted with a plurality of gutter downspout receptacles adapted to receive different sized gutter downspouts. In this regard, as mentioned above, residential downspouts are typically approximately 4" wide, while industrial downspouts are commonly 6" wide. In this exemplary embodiment, the distal end 220 is adapted to receive, in a tight frictional fit, as described above, a larger, industrial gutter downspout. A secondary, intermediate sized region 210 is formed that is adapted to receive a smaller residential gutter downspout. While 4" and 6" gutter downspouts have been described herein, those skilled in the art will recognize that other sizes of gutter downspouts are used, or may, in the future, come to be commonly used. In this exemplary embodiment, distal end 220 could be adapted to receive a large gutter downspout and intermediate sized region 210 could be adapted to receive a smaller gutter downspout. In use, in conjunction with a smaller downspout, distal end 220 could be left on the downspout extension 200, or could be trimmed off.

While the applicant herein makes no claim to the specific color of downspout extensions described herein, such as downspout extension 10, it will be appreciated by those skilled in the art that downspout extension 10 can be extruded in a number of different colors to blend into its surroundings. For instance, a downspout extension 10 that will cross a lawn could be extruded in a green color, while a downspout extension 10 that will traverse a mulched area of landscaping could be extruded in a brown color; as still a further example, the downspout extension 10 could be extruded in a black or dark gray color for diverting rainwater across an asphalt driveway or parking lot.

It will be appreciated by those skilled in the art that the smooth interior 30 of the downspout extension 10 will not create a risk of trapping flow-inhibiting debris. Further, the silicone rubber material resists scuffing, abrasion, or cutting by filament line weed trimmers, is not susceptible to being crushed by foot or wheeled traffic, and is not susceptible to becoming brittle and shattering in sub-freezing temperatures.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A downspout extension for diverting water from a foundation of a structure, said downspout extension comprising
   a tubular body having a selected length, said tubular body having a substantially tubular cross-sectional shape and being constructed of a silicone rubber material having a density selected to substantially resist crushing so as to maintain said substantially tubular cross sectional shape, said silicone rubber material further being adapted to resist cutting and to resist becoming brittle in sub-freezing temperatures, said tubular body having a first end adapted to receive a terminal end of a gutter downspout wherein an interior surface of said tubular body of said downspout extension is substantially smooth along the entire said selected length so as to substantially prevent entrapment of flow-inhibiting debris; and
   wherein said downspout extension has sufficient resiliency to allow an end thereof to be stretched so as to cover an end of a gutter downspout, said downspout extension engaging the gutter downspout in a tight frictional fit.

2. The downspout extension of claim 1 wherein said first end of said tubular body includes at least one hole member provided therein, said hole member adapted and dimensioned for receiving a threaded fastener whereby said downspout extension can be mechanically secured to the gutter downspout.

3. The downspout extension of claim 1 wherein said tubular body of said downspout extension has a substantially oval cross section.

4. The downspout extension of claim 1 wherein said first end is formed into substantially rectangular shape adapted to receive the gutter downspout.

5. The downspout extension of claim 1 wherein said first end is adapted to receive a terminal end of a gutter downspout of a first selected size and said downspout extension further comprises a secondary intermediate region disposed between said first end and said tubular body, wherein said secondary intermediate region is adapted to receive a terminal end of a gutter downspout of a second selected size.

6. The downspout extension of claim 5 wherein said gutter downspout of a first selected size is larger than said gutter downspout of a second selected size.

7. A downspout extension for diverting water from a foundation of a structure, said downspout extension comprising
a tubular body having a selected length, said tubular body having a substantially tubular cross-sectional shape and being constructed of a silicone rubber material having a density selected to substantially resist crushing so as to maintain said substantially tubular cross sectional shape, said silicone rubber material further being adapted to resist cutting and to resist becoming brittle in sub-freezing temperatures, said tubular body having a first end adapted to receive a terminal end of a gutter downspout, wherein said first end of said tubular body includes at least one hole member provided therein, said hole member adapted and dimensioned for receiving a threaded fastener whereby said downspout extension can be mechanically secured to the gutter downspout wherein an interior surface of said tubular body of said downspout extension is substantially smooth along the entire said selected length so as to substantially prevent entrapment of flow-inhibiting debris; and
wherein said downspout extension has sufficient resiliency to allow an end thereof to be stretched so as to cover an end of a gutter downspout, said downspout extension engaging the gutter downspout in a tight frictional fit.

8. The downspout extension of claim 7 wherein said tubular body of said downspout extension has a substantially oval cross section.

9. The downspout extension of claim 7, wherein said first end is formed into substantially rectangular shape adapted to receive the gutter downspout.

10. The downspout extension of claim 7 wherein said first end is adapted to receive a terminal end of a gutter downspout of a first selected size and said downspout extension further comprises a secondary intermediate region disposed between said first end and said tubular body, wherein said secondary intermediate region is adapted to receive a terminal end of a gutter downspout of a second selected size.

11. The downspout extension of claim 10 wherein said gutter downspout of a first selected size is larger than said gutter downspout of a second selected size.

12. A downspout extension for diverting water from a foundation of a structure, said downspout extension comprising
a tubular body having a selected length, said tubular body having a substantially tubular cross-sectional shape and being constructed of a silicone rubber material having a density selected to substantially resist crushing so as to maintain said substantially tubular cross sectional shape, said silicone rubber material further being adapted to resist cutting and to resist becoming brittle in sub-freezing temperatures, wherein an interior surface of said tubular body of said downspout extension is substantially smooth along the entire said selected length so as to substantially prevent entrapment of flow-inhibiting debris, said tubular body having a first end adapted to receive a terminal end of a gutter downspout, wherein said first end is adapted to receive a terminal end of a gutter downspout of a first selected size;
a secondary intermediate region disposed between said first end and said tubular body, wherein said secondary intermediate region is adapted to receive a terminal end of a gutter downspout of a second selected size; and
wherein said downspout extension has sufficient resiliency to allow an end thereof to be stretched so as to cover an end of a gutter downspout, said downspout extension engaging the gutter downspout in a tight frictional fit.

13. The downspout extension of claim 12 wherein said first end of said tubular body includes at least one hole member provided therein, said hole member adapted and dimensioned for receiving a threaded fastener whereby said downspout extension can be mechanically secured to the gutter downspout.

14. The downspout extension of claim 12 wherein said tubular body of said downspout extension has a substantially oval cross section.

15. The downspout extension of claim 12 wherein said first end is formed into substantially rectangular shape adapted to receive the gutter downspout.

16. The downspout extension of claim 12 wherein said gutter downspout of a first selected size is larger than said gutter downspout of a second selected size.

\* \* \* \* \*